United States Patent [19]
Urata et al.

[11] Patent Number: 5,241,398
[45] Date of Patent: Aug. 31, 1993

[54] DROPOUT COMPENSATION DURING TRACK JUMPS

[75] Inventors: Kaoru Urata; Yoshinori Suzuki, both of Kanagawa, Japan

[73] Assignee: Sony Corporation, Tokyo, Japan

[21] Appl. No.: 719,935

[22] Filed: Jun. 24, 1991

[30] Foreign Application Priority Data

Jun. 26, 1990 [JP] Japan .................. 2-169080

[51] Int. Cl.⁵ .............................................. H04N 5/94
[52] U.S. Cl. ...................................... 358/336; 358/314; 360/38.1
[58] Field of Search ............... 358/314, 320, 336, 337, 358/312, 167; 360/38.1

[56] References Cited

U.S. PATENT DOCUMENTS

| | | | |
|---|---|---|---|
| 3,799,780 | 3/1974 | Hayashi | 360/38.1 |
| 4,054,903 | 10/1977 | Ninomiya | 358/314 |
| 4,199,780 | 4/1980 | Taylor | 360/38.1 |
| 4,686,584 | 8/1987 | Kojima et al. | 358/312 |
| 4,937,680 | 6/1990 | Kawasaki | 358/336 |
| 4,953,034 | 8/1990 | Kanda | 358/336 |
| 5,034,823 | 7/1991 | Geerlings | 358/314 |

*Primary Examiner*—Howard W. Britton
*Assistant Examiner*—Huy Nguyen
*Attorney, Agent, or Firm*—William S. Frommer; Alvin Sinderbrand

[57] ABSTRACT

Information signal reproducing apparatus operates to recover an information signal from record tracks at normal and fast-speed playback modes. Dropouts in the information signal reproduced from the tracks are detected to commence a correction signal interval which ends when a synchronizing signal in the reproduced information signal is detected. A corrected information signal is produced by substituting a correction signal for the reproduced information signal substantially throughout the correction signal interval when the apparatus operates in a fast-speed playback mode.

12 Claims, 3 Drawing Sheets

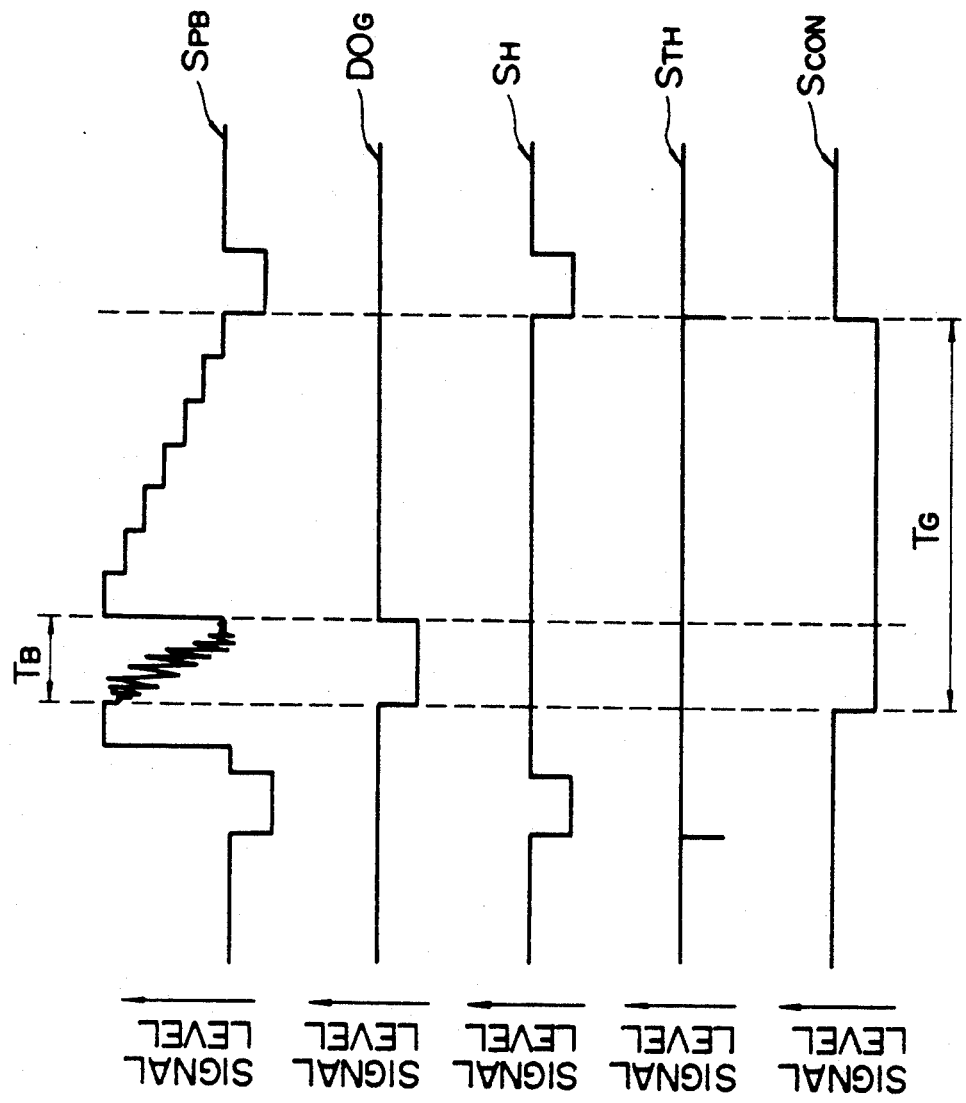

DROPOUT COMPENSATION DURING TRACK JUMPS

BACKGROUND OF THE INVENTION

This invention relates to dropout compensation and, more particularly, to dropout compensation in an information signal that is recovered from successive tracks during a fast-speed playback mode when the playback transducer undergoes a track jump.

In a typical video recorder, video signals are recorded in successive, generally parallel oblique tracks on a magnetic tape. As is conventional, several horizontal lines of video information are recorded in each track; and in many conventional recorders a field interval is recorded in a track. During a playback operation at normal speed (i. e. at the same speed as was used for recording), a rotatable transducer scans an entire track to reproduce all of the horizontal line intervals recorded therein. The resultant video picture is of generally high quality with no noticeable distortion.

During a high speed playback operation, the transducer continues to rotate at the same constant speed used during a normal playback operation, but now the magnetic tape is driven at a higher speed. Consequently, the scanning trace of a transducer no longer is limited to a single track but, rather, the transducer now crosses a plurality of tracks to reproduce video signals from one track, and then from another, and another, and so on.

Timing errors that are expected to arise from the scanning of different tracks during a single scanning trace are corrected by the use of a time base corrector, known to those of ordinary skill in the art. In addition, dropouts which may be present in the video signal recovered from the magnetic tape, such as when a transducer passes over the guard band that normally is used to separate adjacent tracks, are compensated in accordance with known dropout compensation techniques. For example, when the signal level of the reproduced video signal drops below a threshold value, a level corresponding to a gray level is substituted for that low-level video signal. Hence, dropouts due to, for example, a track jump, are compensated by forcing the video signal to the gray level during each dropout interval. As a result, the video picture displayed therefrom includes gray-level images where the low-level video signal had been; and the display of a video picture having gray-level image portions inserted thereon is preferred to a video picture having dropout noise interference.

When the head jumps from one track to the next adjacent track, a portion of a horizontal line interval is recovered from the preceding track and the remainder of the line interval is recovered from the following track. If the horizontal line intervals in adjacent tracks are in precise alignment (known typically as H-alignment), the track jump of the transducer from one track to the next is expected to result in substantially no synchronization problem because the duration of the reproduced horizontal line interval pieced together from the preceding and following tracks is substantially equal to the horizontal line interval recorded in either track. Of course, that portion of the guard band scanned by the transducer produces dropout which is compensated in accordance with the aforementioned gray-level substitution.

However, in actual practice, the horizontal line intervals recorded in adjacent tracks often are not in precise H-alignment. The presence of tape jitter during the recording of one track but not during the recording of the next adjacent track may result in such incomplete H-alignment. Consequently, when a portion of a horizontal line interval is reproduced from one track and the remainder of the horizontal line interval is reproduced from the adjacent track, the overall length of the reproduced line interval may be greater than the standard length of a line interval recorded in either track. This enlarged line interval produced during a track jump is corrected by time base correction techniques; but the resultant video picture attributed to this correction of the reproduced line interval appears as cramped distortion. Furthermore, the phase of the chrominance signal reproduced from the track following the track jump is not synchronized to the horizontal synchronizing signal that is reproduced from the track which precedes the track jump, and this lack of phase synchronization is not easily corrected by typical time base correction techniques. This results in further distortion of the video picture that is reproduced during this high speed playback mode.

Therefore, the usual dropout compensation technique which substitutes a gray-level signal for the reproduced video signal when a dropout is detected, such as during the interval that the transducer scans the guard band, and the usual time base correction technique, which does not full satisfy a lack of phase synchronization in the chrominance signal, do not produce a video picture of satisfactory quality.

OBJECTS AND SUMMARY OF THE INVENTION

Therefore, it is an object of the present invention to provide a technique for reproducing a video signal at high playback speeds which overcomes the aforenoted drawbacks of prior art techniques.

Another object of this invention is to reproduce video signals at a high speed without causing cramped distortion in the video picture produced therefrom.

A further object of this invention is to reproduce video signals at a high speed without producing chrominance distortion in the video picture due to track jumps.

An additional object of this invention is to produce a corrected information signal during high speed playback modes when track jump intervals are present.

Yet another object of this invention is to produce a corrected video signal during high speed playback modes by substituting a reference level for the actual video signal during the entire line interval that is present when the transducer jumps from one track to the next adjacent track.

Various other objects, advantages and features of the present invention will become readily apparent from the ensuing detailed description, and the novel features will be particularly pointed out in the appended claims.

In accordance with this invention, information signals, such as video signals, are recovered from successive record tracks on a record medium. A correction signal interval is defined to commence when a dropout in the reproduced video signal is detected and to end when a synchronizing signal in that reproduced video signal next occurs; and a correction signal is substituted for the reproduced video signal throughout this correction signal interval when the video signals are reproduced at a fast-speed playback mode.

As one feature of this invention, the correction signal is produced by a reference signal generator which is triggered in response to a detected dropout and is deactivated in response to a detected synchronizing signal. In one embodiment, the reference signal is a gray level signal.

As another feature of this invention, the correction signal interval commences when dropout is detected as the guard band that separates adjacent tracks is scanned. Dropouts caused by the guard band are discriminated from other dropouts which may be present in the reproduced video signal and which do not necessarily trigger the correction signal interval.

As yet another feature of this invention, a time base corrector is used to produce the corrected video signal, this time base corrector having a memory for temporarily storing at least one vertical interval of the reproduced video signals, such as a frame, and wherein the correction signal, such as the aforementioned gray level reference signal, is written into the memory in place of the reproduced video signal during the correction signal interval. As another implementation of this feature, no new information is written into the memory, neither the reproduced video signal nor the gray level reference signal, during the correction signal interval, such that the video signal previously stored in the memory is used once again during the correction signal interval to serve as the correction signal.

BRIEF DESCRIPTION OF THE DRAWINGS

The following detailed description, given by way of example and not intended to limit the present invention solely thereto, will best be understood in conjunction with the accompanying drawings in which:

FIGS. 3A-3E are waveform diagrams of various signals produced by the apparatus shown in FIG. 2 and are useful in explaining the operation of this invention.

DETAILED DESCRIPTION OF A PREFERRED EMBODIMENT

Figure 1:
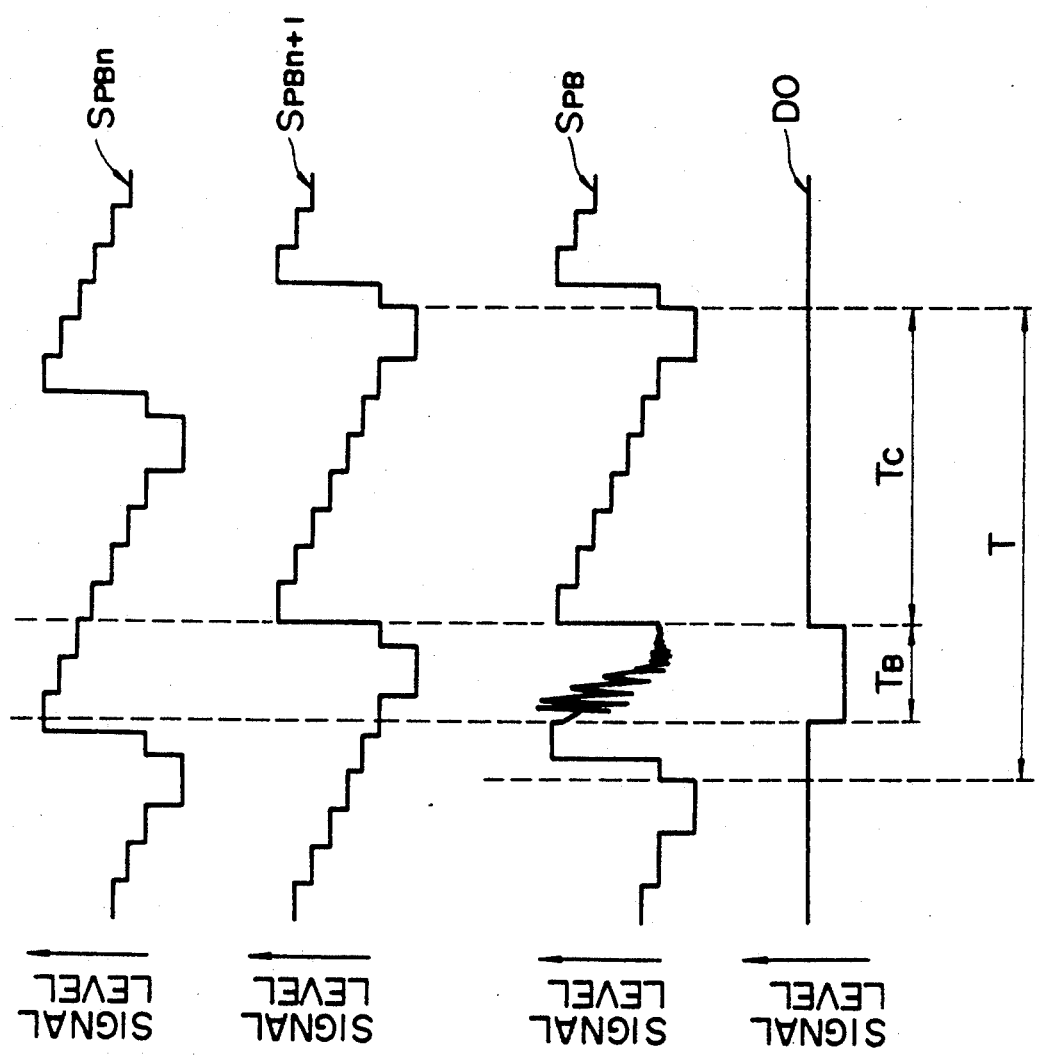
FIGS. 1A-1D are waveform diagrams which are useful in understanding the problem that is solved by the present invention.

To best appreciate the problem which is solved by the present invention, reference now is made to FIGS. 1A-1D which illustrate waveforms reproduced by video signal playback apparatus operating at a high playback speed. It is assumed that, during a high speed playback mode, the transducer, or playback head, which normally scans an entire oblique video track recorded on a magnetic tape scans a portion of track n and then jumps to scan a portion of the next adjacent track (n+1). FIGS. 1A and 1B illustrate the video waveforms recorded in tracks n and (n+1) respectively; and it is seen that the horizontal synchronizing signal recorded in track n is not in precise alignment with the horizontal synchronizing signal recorded in track (n+1). This lack of H-alignment in the adjacent tracks is not unusual and may be caused by, for example, jitter in the movement of the magnetic tape when track n or when track (n+1) is recorded.

It is further assumed that the playback head jumps from track n to track (n+1) during the interval $T_B$ defined by the broken lines shown in FIGS. 1A and 1B. The resultant video signal $S_{PB}$ reproduced by the playback head is a composite derived from tracks n and (n+1) and thus may appear as shown in FIG. 1C. It will be seen that the horizontal synchronizing signal recorded in track n is reproduced as well as a beginning portion of the useful video information in the line interval established by this horizontal synchronizing signal. Then, the playback head jumps from track n to track (n+1); and it is assumed that a guard band separates these adjacent tracks and the information (or lack thereof) included in this guard band is reproduced by the playback head. The signals reproduced from the guard band are illustrated in FIG. 1C as a noise component in interval $T_B$. Then, the playback head reproduces the video signal recorded in the next-following track (n+1), which is assumed to start with the beginning portion of the useful video information recorded in track (n+1). The horizontal synchronizing signal recorded in track (n+1) also is reproduced, as illustrated in FIG. 1C.

As mentioned above, the reproduced video signal $S_{PB}$ is a composite comprised of a portion of the video signal $S_{PBn}$ recorded in track n and a portion of the video signal $S_{PB(n+1)}$ recorded in track (n+1). The horizontal line interval of the reproduced video signal $S_{PB}$ during this track jump operation commences with the horizontal synchronizing signal reproduced from track n and ends with the next horizontal synchronizing signal which, it is seen, is reproduced from track (n+1). Because of the lack of H-alignment between these tracks, the horizontal line interval of the reproduced video signal $S_{PB}$ exhibits a duration T which is greater than the duration of the horizontal line interval of either video signal $S_{PBn}$ or video signal $S_{PB(n+1)}$. As is seen clearly from FIG. 1C, the chrominance signal of the reproduced video signal $S_{PB}$ which is recovered from track (n+1) is synchronized with the horizontal synchronizing signal recorded in track (n+1), but the horizontal synchronizing signal which precedes this chrominance signal in the reproduced video signal $S_{PB}$ is derived from track n. Thus, the phase of the chrominance signal included in the reproduced video signal $S_{PB}$ during this line interval T is not synchronized with the horizontal synchronizing signal in this line interval. Consequently, the chrominance signal during line interval T will exhibit phase distortion that is not easily corrected by time base correction, thus causing distortion in the video picture produced from the reproduced video signal $S_{PB}$.

FIG. 1C illustrates that the reproduced video signal $S_{PB}$ includes a noise signal during the interval $T_B$ that the playback head scans the guard band between tracks n and (n+1). This noise signal is readily detected by a dropout detector, resulting in the dropout detection signal DO shown in FIG. 1D. It will be appreciated (although not precisely drawn in FIG. 1C) that the level of the reproduced video signal $S_{PB}$ while the guard band is scanned is less than a dropout threshold level. Hence, the dropout signal DO shown in FIG. 1D may be easily produced. To prevent the noise signal present in the reproduced video signal $S_{PB}$ during the guard band scanning interval $T_B$ from being reproduced as a video picture, a reference level, such as a gray level signal, is substituted for the reproduced video signal $S_{PB}$ during the dropout detected interval $T_B$. Of course, during the interval $T_C$ which follows this dropout interval $T_B$, the reproduced video signal $S_{PB}$ is present.

Although noise due to dropout as the playback head jumps from track n to track (n+1) is suppressed by inserting a gray level signal into the reproduced video signal $S_{PB}$ during the dropout interval $T_B$, thus inhibiting the display of noise in the video picture during this interval, cramped distortion due to the lack of phase synchronization between the chrominance signal during interval $T_C$ and the horizontal synchronizing signal at the beginning of the line interval T is present. This drawback of cramped distortion is present during a high speed playback mode, such as on the order of about thirty times normal playback speed, but is not as noticeable during lower playback speeds. The present invention operates to prevent such cramped distortion at high playback speeds.

Figure 2:
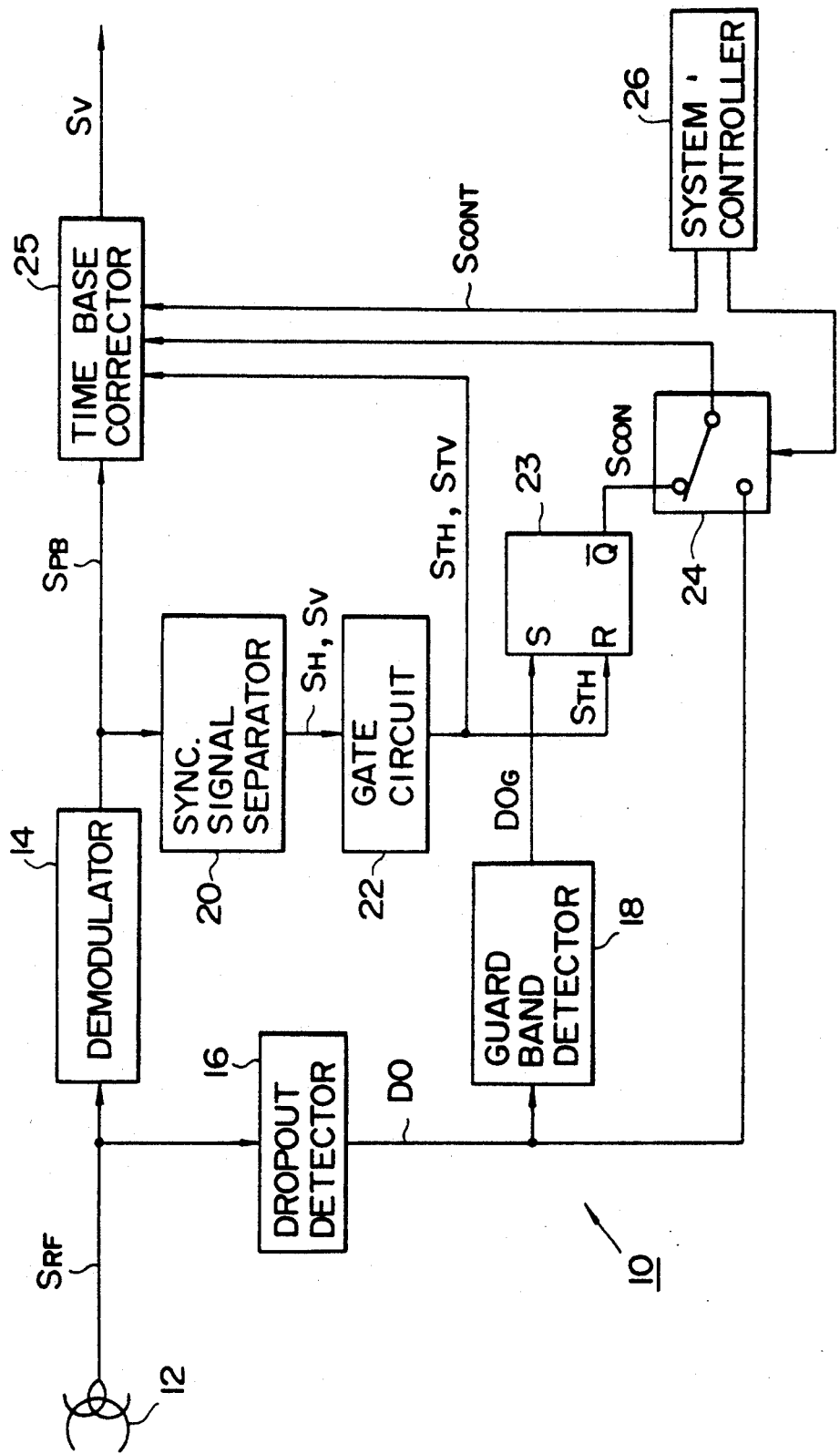
FIG. 2 is a block diagram of one embodiment of the present invention.

Turning now to FIG. 2, there is illustrated a block diagram of video signal reproducing apparatus 10 in accordance with one embodiment of the present invention. As illustrated, apparatus 10 includes a dropout detector 16, a guard band detector 18, a synchronizing signal separator 20, a reference signal generator 23, a time base corrector 25 and a system controller 26. A playback head 12 is adapted to scan an oblique record track during a playback operation at normal speed, and this head undergoes a track jump to scan portions of plural tracks during a high speed playback operation. As head 12 traverses a magnetic tape on which are recorded the record tracks, a video signal $S_{RF}$ is recovered from each record track (or portion thereof) scanned thereby. It will be appreciated that in a preferred embodiment, two or more playback heads are used to scan respective traces across the magnetic tape. Head 12 is coupled to dropout detector 16 and to a demodulator 14, the latter serving to demodulate the video signal recovered from the magnetic tape which, it is recognized, typically is recorded as a modulated signal. Demodulator 14 is conventional and further description thereof is not provided.

Dropout detector 16 is adapted to detect when the magnitude of the video signal recovered from the magnetic tape is less than a threshold level. Low level video signals are assumed to be attributed to dropout; and the dropout detector operates to generate a dropout signal DO for so long as the magnitude of the video signal is less than the aforementioned threshold. In one embodiment, dropout detector 16 operates to generate a negative-going pulse of duration corresponding to the detected dropout interval.

Guard band detector 18 is coupled to dropout detector 16 and is adapted to detect when a dropout is produced in response to the traversal of a guard band by head 12. It is expected that the dropout detector will generate dropout signals whenever a dropout is detected in the recovered video signal $S_{RF}$, whether or not head 12 is scanning the guard band. It has been found that for higher playback speeds wherein head 12 undergoes a track jump, a guard band is traversed periodically. This periodicity of scanning the guard band is predictable, and guard band detector 18 includes a timing circuit synchronized to such periodicity. For example, the guard band detector may include a window pulse generator for generating window pulses at a repetition rate equal to the periodicity at which guard bands are traversed. If a dropout signal DO is generated by dropout detector 16 during a window pulse interval, guard band detector 18 functions to pass the dropout signal, thus producing a guard band detection signal $DO_G$. Stated otherwise, guard band detector 18 is adapted to detect the presence of dropout at the time that the traversal of a guard band is expected.

Demodulator 14 is coupled to a synchronizing signal separator 20 which may be a conventional sync separator adapted to separate horizontal synchronizing signals $S_H$ as well as vertical synchronizing signals $S_V$ from the demodulated video signal $S_{PB}$ reproduced from the magnetic tape. A gate circuit 22 is coupled to synchronizing signal separator 20 and is adapted to generate a trigger signal in response to a negative transition in the separated horizontal and vertical synchronizing signals. These trigger signals are referred to as the horizontal trigger signal $S_{TH}$, which is produced in response to the separated horizontal synchronizing signal, and as the vertical trigger signal $S_{TV}$, which is derived from the separated vertical synchronizing signal.

Reference signal generator 23 is illustrated as a bistate device, such as a set/reset flip-flop circuit, having a set input terminal S, a reset input terminal R and an inverted output terminal $\overline{Q}$. The set input terminal of bistate device 23 is coupled to guard band detector 18 and is adapted to receive the guard band detection signal $DO_G$. The reset input terminal R of the bistate device is coupled to gate circuit 22 and is adapted to receive the horizontal trigger signal $S_{TH}$. In the preferred embodiment, bistate device 23 is set or reset on a negative edge of the signal applied to the set or reset input terminals and is triggered to its set state in response to the guard band detection signal $DO_G$ and is changed over to its reset state in response to the horizontal trigger signal $S_{TH}$. The $\overline{Q}$ output terminal of bistate device 23 is adapted to produce a relatively low level reference signal when the bistate device admits of its set state and to produce a relatively high level signal when the bistate device admits of its reset state. In the preferred embodiment, the low level signal $S_{CON}$ produced at the $\overline{Q}$ output terminal of bistate device 23 corresponds to a gray level video signal.

A time base corrector 25, which may be conventional, includes a memory circuit having a capacity sufficient to store at least one vertical interval of the reproduced video signal $S_{PB}$ such as a field interval or, preferably, a frame interval. In the preferred embodiment, the memory circuit included in time base corrector 25 is adapted to store at least one frame of reproduced video signals. Although not shown in FIG. 2, it will be appreciated that the time base corrector includes a write circuit synchronized with the horizontal synchronizing signal included in the reproduced video signal $S_{PB}$ and a memory address generator to write into the memory circuit the video signals recovered from the magnetic tape. The time base corrector also includes a read circuit synchronized to a reference clock to read out the video signals temporarily stored in the memory circuit. The video signal $S_V$ thus produced by time base corrector 25 is substantially free of time base errors and, as will be described below, is a corrected video signal.

Gate circuit 22 is coupled to time base corrector 25 to supply the horizontal trigger signal $S_{TH}$ and the vertical trigger signal $S_{TV}$ thereto. These trigger signals are used by the time base corrector for synchronizing the write-in clock and memory address generator, as is conventional. The time base corrector also is coupled to a selector switch 24 whose state is controlled by a system controller 26 to supply to the time base corrector either the reference level $S_{CON}$ produced at the $\overline{Q}$ output of bistate device 23 or the dropout detection signal DO. Selector switch 24 preferably is a conventional solid-state switching device; but for convenience is illustrated herein as an electromechanical change-over switch having one input coupled to the $\overline{Q}$ output of the bistate device to receive the reference level $S_{CON}$ and another input coupled to dropout detector 16 to receive the dropout detection signal DO. Depending upon the state of the selector switch, either the reference level $S_{CON}$ or the dropout detection signal DO is supplied to time base corrector 25.

System controller 26 preferably includes a microprocessor, such as are manufactured by Hitachi, Motorola, Intel, or others, or other processing device and is coupled to selector switch 24 and to time base corrector 25. The system controller supplies a state selection signal to switch 24 so as to establish the state of this switch, whereby either the reference level $S_{CON}$ or the dropout detection signal DO is supplied by selector switch 24 to the time base corrector. System controller 26 supplies a control signal $S_{CONT}$ to time base corrector 25 for controlling selected operations of the time base corrector. For example, when the video signal reproducing apparatus operates at a playback speed that is less than the threshold speed, for instance, if the video signal reproducing apparatus operates at a speed less than thirty times the normal playback speed, system controller 26 operates selector switch 24 to supply the dropout detection signal DO to the time base corrector. In addition, the control signal $S_{CONT}$ supplied by the system controller to time base corrector 25 serves to inhibit the write circuit included in the time base corrector during the duration of each dropout detection signal DO. It will be appreciated, then, that when a dropout is present in the video signal $S_{RF}$ recovered from the magnetic tape at playback speeds less than thirty times normal, any dropouts that may be present in the reproduced video signal $S_{PB}$ are not written into the memory of the time base corrector. Rather, whatever video signals had been written thereinto previously remain in the memory in place of the dropouts that otherwise are present in the video signal. For example, if the memory is adapted to store a frame of video signals, that portion of the video signal of a preceding frame is reused in the frame now received instead of the dropout which otherwise is present in the received frame.

When the video signal reproducing apparatus operates at a playback speed equal to or greater than the threshold speed, for example, a playback speed equal to or greater than thirty times normal speed, system controller 26 controls selector switch 24 to couple the reference level $S_{CON}$ produced by bistate device 23 to time base corrector 25. At this time, the control signal $S_{CONT}$ to the time base corrector by the system controller controls the write circuit to write the reference level $S_{CON}$ into the memory in place of the reproduced video signal $S_{PB}$ during the interval that the reference level is present. As will be described below, the reference level may be thought of as a correction signal which is substituted for the reproduced video signal $S_{PB}$ during the interval that this correction signal $S_{CON}$ is present.

The manner in which the video signal reproducing apparatus illustrated in FIG. 2 operates now will be described in conjunction with the waveform diagrams of FIGS. 3A-3E. Let it be assumed that playback head 12 undergoes a track jump from track n to track (n+1), similar to the track jump described hereinabove in conjunction with FIGS. 1A-1C. It is appreciated that the reproduced video signal $S_{PB}$ derived from head 12 is substantially similar to aforedescribed video signal $S_{PB}$ shown in FIG. 1C and is illustrated in FIG. 3A. As before, when the head jumps from track n to track (n+1), it traverses the guard band separating these tracks, and the information (or lack thereof) included in this guard band is reproduced by head 12. The reproduction of the guard band is illustrated in FIG. 3A as a noise component in interval $T_B$. Thus, a portion of track n followed by the guard band followed by a portion of track (n+1) is reproduced by playback head 12, resulting in the reproduced video signal $S_{PB}$ shown in FIG. 3A.

When dropout is detected in the guard band interval $T_B$, guard band detector 18 responds to the dropout detection signal DO to produce the guard band signal $DO_G$ shown in FIG. 3B. As mentioned above, the guard band detector may include a window generator which generates window pulses corresponding to the times that the traversal of guard bands is expected. If a dropout detection signal DO coincides with such window pulses, guard band detector 18 produces the guard band signal $DO_G$. FIG. 3B illustrates a negative-going pulse as the guard band signal.

As mentioned above, bistate device 23 preferably is of the negative-edge triggered type. Consequently, the negative transition in the guard band signal $DO_G$ sets bistate device 23 to its set state. As a result, output terminal $\overline{Q}$ produces a relatively low reference level commencing with the triggering of the bistate device. This low reference level is illustrated in FIG. 3E as correction signal $S_{CON}$.

Synchronizing signal separator 20 separates the horizontal and vertical synchronizing signals included in the reproduced video signal $S_{PB}$. FIG. 3C illustrates the separated horizontal synchronizing signals. It is seen that these separated horizontal synchronizing signals appear as negative-going pulses. Gate circuit 22 responds to the negative transitions in the separated horizontal synchronizing signals $S_H$ to produce the horizontal trigger signal $S_{TH}$ shown in FIG. 3D. This trigger signal substantially coincides with the negative transition of the separated horizontal synchronizing signal and is represented as a negative-going impulse. The horizontal trigger signal $S_{TH}$ resets bistate device 23, whereupon the reference level produced at the $\overline{Q}$ output terminal reverts to its normally higher level. FIG. 3E illustrates this positive transition in correction signal $S_{CON}$ produced by bistate device 23 in response to the horizontal trigger signal $S_{TH}$.

During a high speed playback operation greater than, for example, thirty times normal speed, the correction signal $S_{CON}$ shown in FIG. 3E and produced by bistate device 23 is supplied to time base corrector 25 by selector switch 24. It is seen from FIG. 3E that this correction signal is present during an interval $T_G$ that commences when a dropout caused by traversal of the guard band is detected in the reproduced video signal, and this interval $T_G$ ends in response to the next-occurring horizontal synchronizing signal $S_H$ that is present in the reproduced video signal. This interval $T_G$ is referred to as a correction signal interval.

With the video signal reproducing apparatus operating at a high playback speed (assumed to be equal to or greater than thirty times normal speed), the correction signal $S_{CON}$ produced during the correction signal interval $T_G$ is written into the memory of time base corrector 25 in place of the reproduced video signal $S_{PB}$. For example, if the magnitude of the correction signal is equal to a gray image level, then a so-called gray level is substituted for the reproduced video signal $S_{PB}$ during the correction interval $T_G$. As a result, when the video signal $S_{PB}$, including the substituted gray level, is read from the time base corrector memory, the chrominance signal which heretofore had been present during interval $T_C$ (shown in FIG. 1D) and which was not phase synchronized with its immediately preceding horizontal synchronizing signal no longer is present. In place of this chrominance signal is the correction signal $S_{CON}$ which, in the present embodiment, exhibits a gray image level. Hence, cramped distortion that otherwise would be present because of the lack of synchronism between the chrominance signal and its preceding horizontal synchronizing signal is avoided.

In the event that dropouts are present in the reproduced video signal $S_{PB}$ at locations other than when a guard band is traversed, the dropout detection signal DO will not coincide with a guard band window signal and, therefore, the guard band signal $DO_G$ will not be produced. It will be appreciated, therefore, that the substitution of a gray level correction signal for the video signal during such other dropout periods will not occur. Thus, the gray level signal is substituted for the video signal only when a dropout due to a track jump is present.

During other playback modes which operate at less than the aforementioned high playback speed (e. g. at playback speeds less than thirty times normal), system controller 26 sets selector switch 24 to couple the dropout detection signal DO produced by dropout detector 16 to time base corrector 25. In addition, system controller 26 controls the time base corrector 25 such that, when a dropout detection signal is supplied to the time base corrector during this playback operation, the write circuit included in the time base corrector is inhibited from writing into the memory the reproduced video signal $S_{PB}$ during the duration of the dropout detection signal DO. Consequently, the video signal that had previously been written into the memory is not replaced by the currently reproduced video signal during such dropout intervals, and the previously stored video signal is re-read when the contents of the memory are read out. Thus, a dropout is replaced by the video signal that had been present in, for example, the preceding frame.

The foregoing has described the operation of substituting a correction signal $S_{CON}$ for the reproduced video signal $S_{PB}$ when the playback speed exceeds thirty times normal speed. It will be appreciated, however, that any other desired threshold playback speed may be selected to carry out this correction signal substitution operation. Furthermore, although the correction signal has been described as a gray level signal, any other reference level may be selected, such as a black level signal. As yet another alternative, system controller 26 may control time base corrector 25 such that, when a correction signal $S_{CON}$ is produced, the write circuit included in the time base corrector is inhibited from writing the reproduced video signal $S_{PB}$ into the time base corrector memory during the interval defined by the correction signal, such that the video signal that had been stored in the memory during this interval in the preceding frame is used once again. Hence, the video signal reproduced during the preceding frame is used as the correction signal during the correction signal interval $T_G$.

The track jump operation of video signal reproducing apparatus 10 has been described in conjunction with a guard band that separates adjacent tracks. The present invention may operate satisfactorily even if adjacent tracks are not separated by a guard band. For example, one type of video recording format which omits guard bands relies upon azimuth loss to minimize crosstalk pickup from an adjacent track. This is achieved by scanning successive tracks with transducers having different azimuth angles. Typically, adjacent tracks are recorded with different azimuth angles such that when the video signals in a given track are reproduced with a transducer having the same azimuth angle as was used for recording, signals that were recorded in the adjacent track with a transducer of a different azimuth angle are subject to azimuth loss and, thus, are not picked up. Hence, as a transducer crosses tracks having signals recorded therein with different azimuth angles than that of the transducer, the phenomenon of azimuth loss results in a reproduced video signal whose level is so low as to be interpreted as a dropout. Therefore, when operating at a high playback speed to reproduce video signals from adjacent tracks having no guard band therebetween, a correction signal interval is defined to commence when the transducer undergoes a track jump to scan a track in which signals were recorded with different azimuth, and the interval ends when a synchronizing signal is detected. It is expected that such detection of a synchronizing signal will occur when the transducer undergoes yet another track jump to arrive at a track in which the signals were recorded with the same azimuth. Thus, the correction signal interval $T_G$ may be much longer when video signals are played back from tracks that are recorded with different azimuths and have no guard band therebetween than when video signals are played back from tracks which are separated by a guard band. It is appreciated that cramped distortion is avoided at high playback speeds when reproducing video signals that have been recorded in either format. In both formats, a correction signal is substituted for the video signal reproduced from the record medium when that reproduced video signal will produce cramped distortion of the video picture.

While the present invention has been particularly shown and described with reference to a preferred embodiment, it will be readily appreciated by those of ordinary skill in the art that various changes and modifications may be made without departing from the spirit and scope of the invention. Some alternatives have been discussed above. It also will be recognized that the present invention need not be limited solely to the reproduction of video signals from a record medium. Rather, the present invention is readily adapted to recover other information signals which are recorded in parallel adjacent tracks so as to minimize distortion therein.

It is, therefore, intended that the appended claims be interpreted as covering the embodiment described herein, the alternatives discussed above and all equivalents thereto.

What is claimed is:

1. Signal reproducing apparatus for recovering an information signal from record tracks on a record medium at normal and fast-speed playback modes, comprising: input means for supplying an information signal reproduced from said record medium; dropout detecting means for detecting dropouts in the reproduced information signal; synchronizing signal detecting means for detecting a synchronizing signal in the reproduced information signal; correction signal defining means responsive to said dropout detecting means and said synchronizing signal detecting means for defining a correction signal interval commencing when a dropout in the reproduced information signal is detected and ending when a synchronizing signal is detected; and correction means including means for generating a correction signal and means for substituting said correction signal for the reproduced information signal during said correction signal interval when the apparatus operates in a fast-speed playback mode.

2. The apparatus of claim 1 wherein said means for generating a correction signal includes a reference signal generator triggered in response to a detected dropout in the reproduced information signal to produce a reference level and deactivated in response to a detected synchronizing signal, and wherein said correction means substitutes said reference level for said reproduced information signal.

3. The apparatus of claim 2 wherein said information signal is a video signal and said reference level is a gray level.

4. The apparatus of claim 2 wherein adjacent tracks are separated by a guard band and a playback head crosses said guard band while playing back said information signals; and wherein said correction signal defining means further includes sensing means for sensing when said detected dropout occurs as said playback head crosses a guard band to trigger said reference signal generator.

5. The apparatus of claim 2 wherein said information signal is reproduced by a playback head which executes a track jump during said fast-speed playback mode, and wherein said correction signal defining means includes sensing means for sensing when said detected dropout occurs during a track jump to trigger said reference signal generator.

6. The apparatus of claim 5 wherein said means for generating a correction signal comprises bistate means triggered from a first state to a second state in response to said sensing means and returned from said second state to said first state in response to the detected synchronizing signal.

7. The apparatus of claim 2 wherein said information signal is a video signal and said syncronizing signal detecting means comprises a horizontal synchronizing signal detector for detecting a horizontal synchronizing signal in the reproduced video signal.

8. The apparatus of claim 1 wherein said information signal is a video signal and said correction means includes time base correcting means having a memory means for temporarily storing at least one vertical interval of reproduced video signals written thereinto and write means for writing each new vertical interval of video signals reproduced from said record medium into said memory means, and means for controlling said write means during said fast-speed playback mode to write said correction signal into said memory means in place of said reproduced video signal.

9. The apparatus of claim 8 wherein said correction means further includes means for supplying a gray level signal as said correction signal.

10. The apparatus of claim 8 wherein said means for controlling said write means is operative to selectively control said time base correcting means during playback modes at speeds less than a predetermined fast-speed to inhibit the writing of a new vertical interval of said reproduced video signal into said memory means in response to a detected dropout, such that a vertical interval of video signal previously stored in said memory means is not replaced by the new vertical interval of reproduced video signal during said dropout.

11. The apparatus of claim 10 wherein said dropout detecting means produces dropout indicating signals of respective durations substantially equal to the detected dropouts, and wherein said correction means further includes switch means and switch control means for indicating playback mode speeds to operate said switch means during playback mode speeds greater than a predetermined fast-speed to supply said correction signal to said time base correcting means for writing into said memory means and to operate said switch means during playback mode speeds less than said predetermined fast-speed to supply said dropout indicating signals to said time base correcting means for inhibiting the writing into said memory means of said reproduced video signal during dropout durations.

12. The apparatus of claim 1 wherein said information signal is a video signal and said correction means includes time base correcting means having memory means for temporarily storing at least one vertical interval of reproduced video signals written thereinto and operable during said fast-speed playback mode in response to a control signal to inhibit the writing of said reproduced video signal thereinto during said correction signal interval, such that a video signal previously stored in said memory means is not replaced by said reproduced video signal during said correction signal interval and constitutes said correction signal, and control signal generating means for generating said control signal when said signal reproducing apparatus operates at said fast-speed playback mode.

* * * * *